May 15, 1962 E. V. ANDERSON ETAL 3,034,844
ENCLOSURE
Filed Jan. 21, 1958 6 Sheets-Sheet 1
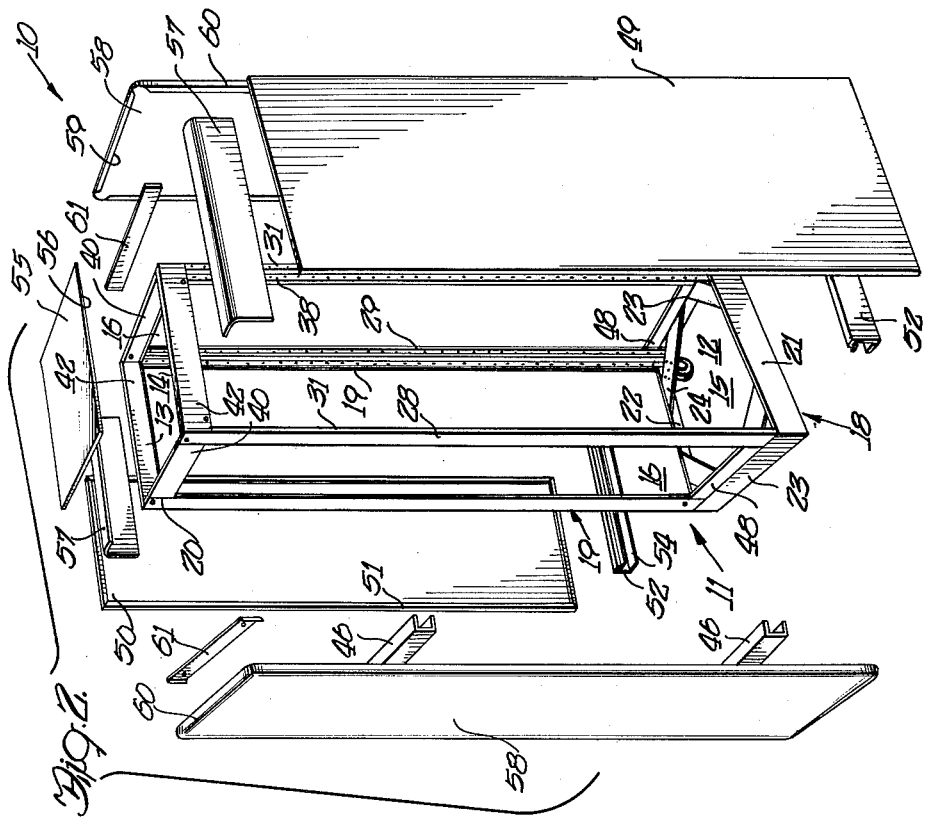
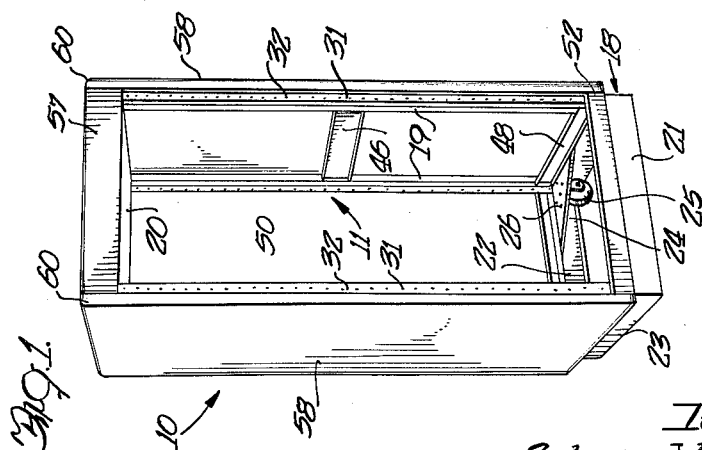
Inventors
Edwin V. Anderson
Joseph A. Mack
Arthur N. Freiberg
Dalbert U. Shifte
Attorney May 15, 1962   E. V. ANDERSON ETAL   3,034,844
ENCLOSURE
Filed Jan. 21, 1958   6 Sheets-Sheet 2
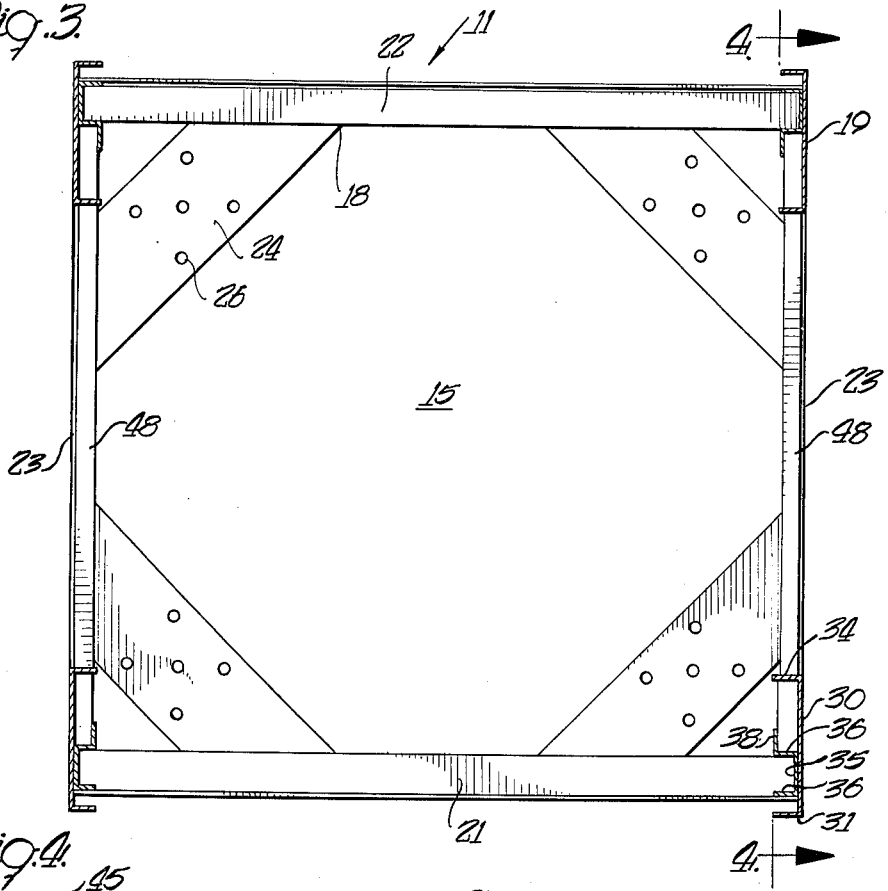
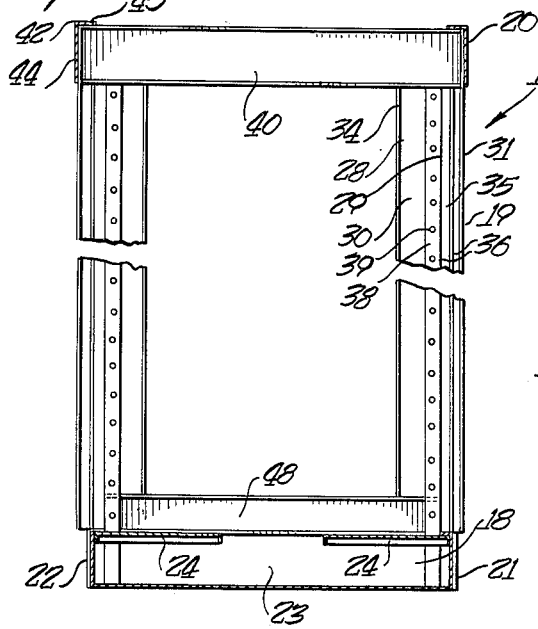
Inventors
Edwin V. Anderson
Joseph A. Mack
Arthur H. Friberg
Delbert U. Shefte
Attorney May 15, 1962
E. V. ANDERSON ETAL
3,034,844
ENCLOSURE
Filed Jan. 21, 1958
6 Sheets-Sheet 3
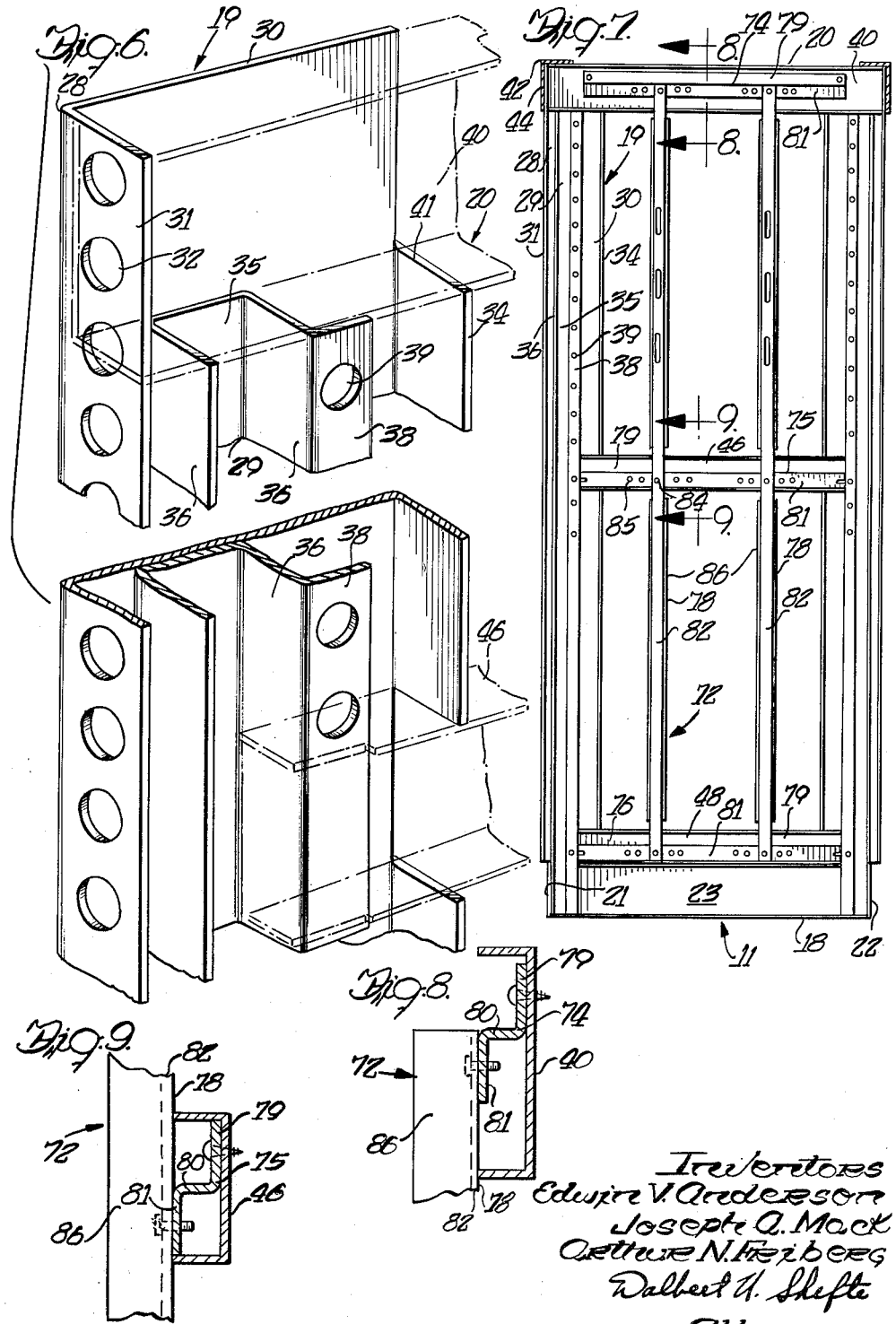

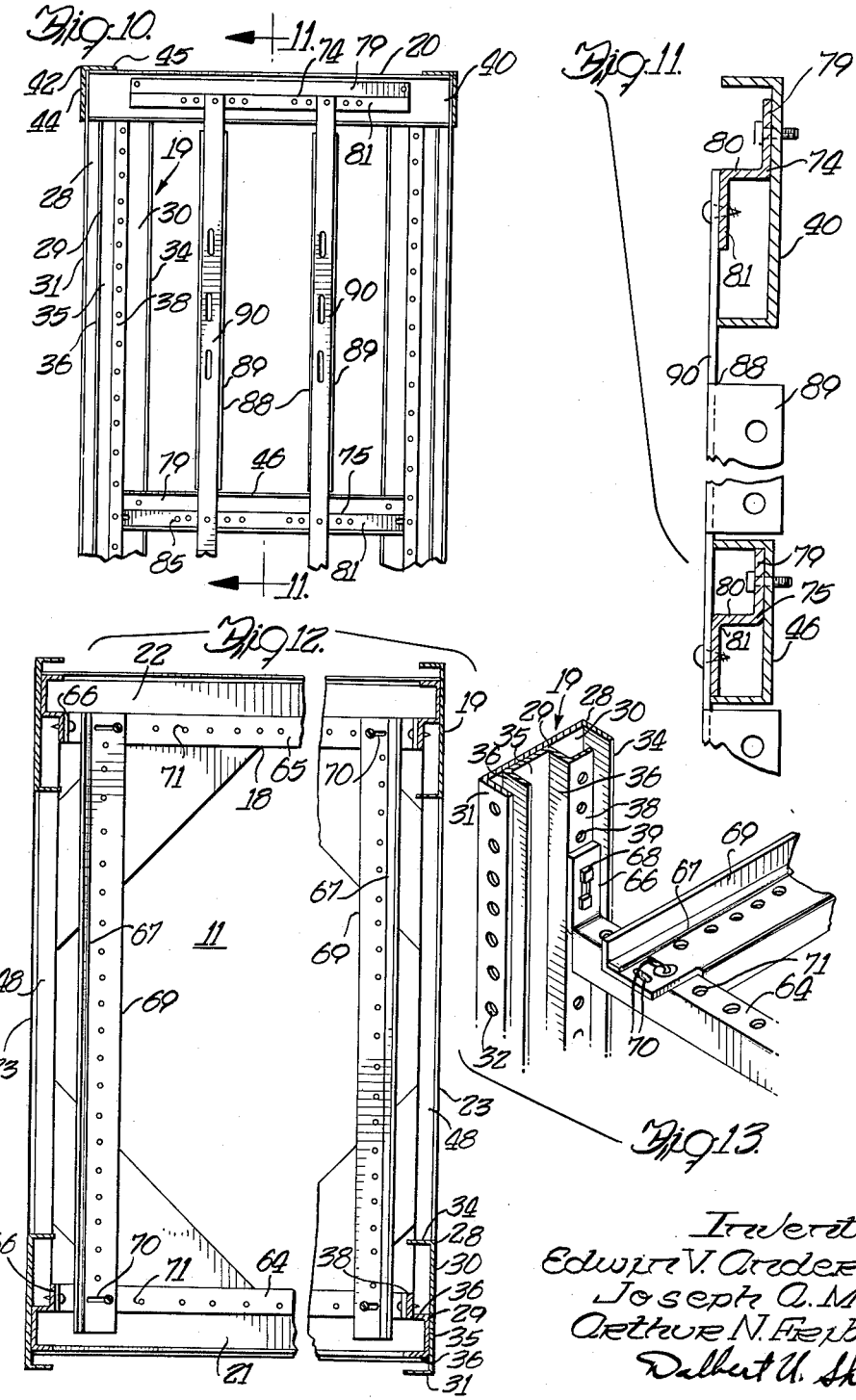

May 15, 1962 E. V. ANDERSON ETAL 3,034,844
ENCLOSURE
Filed Jan. 21, 1958 6 Sheets-Sheet 5
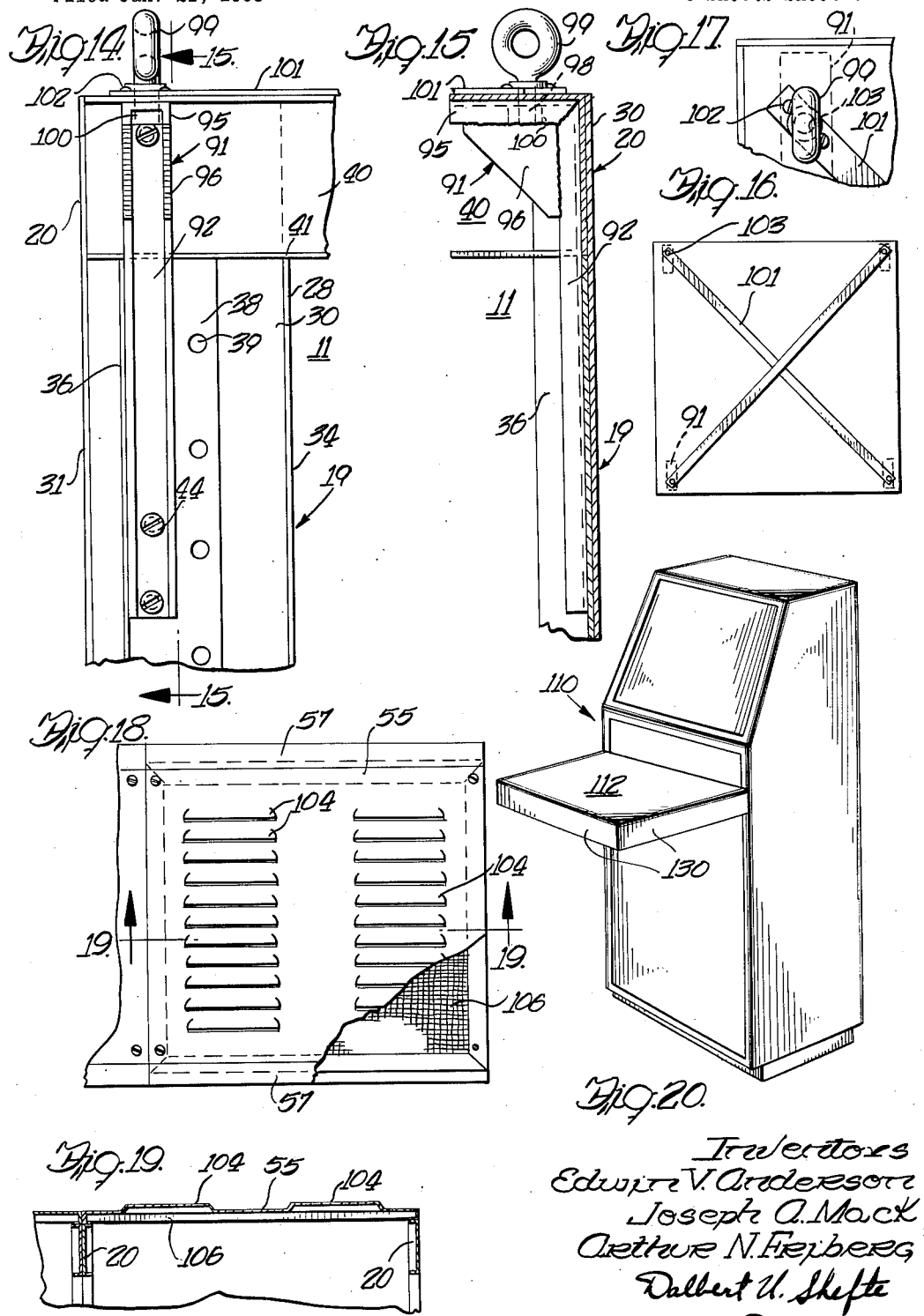

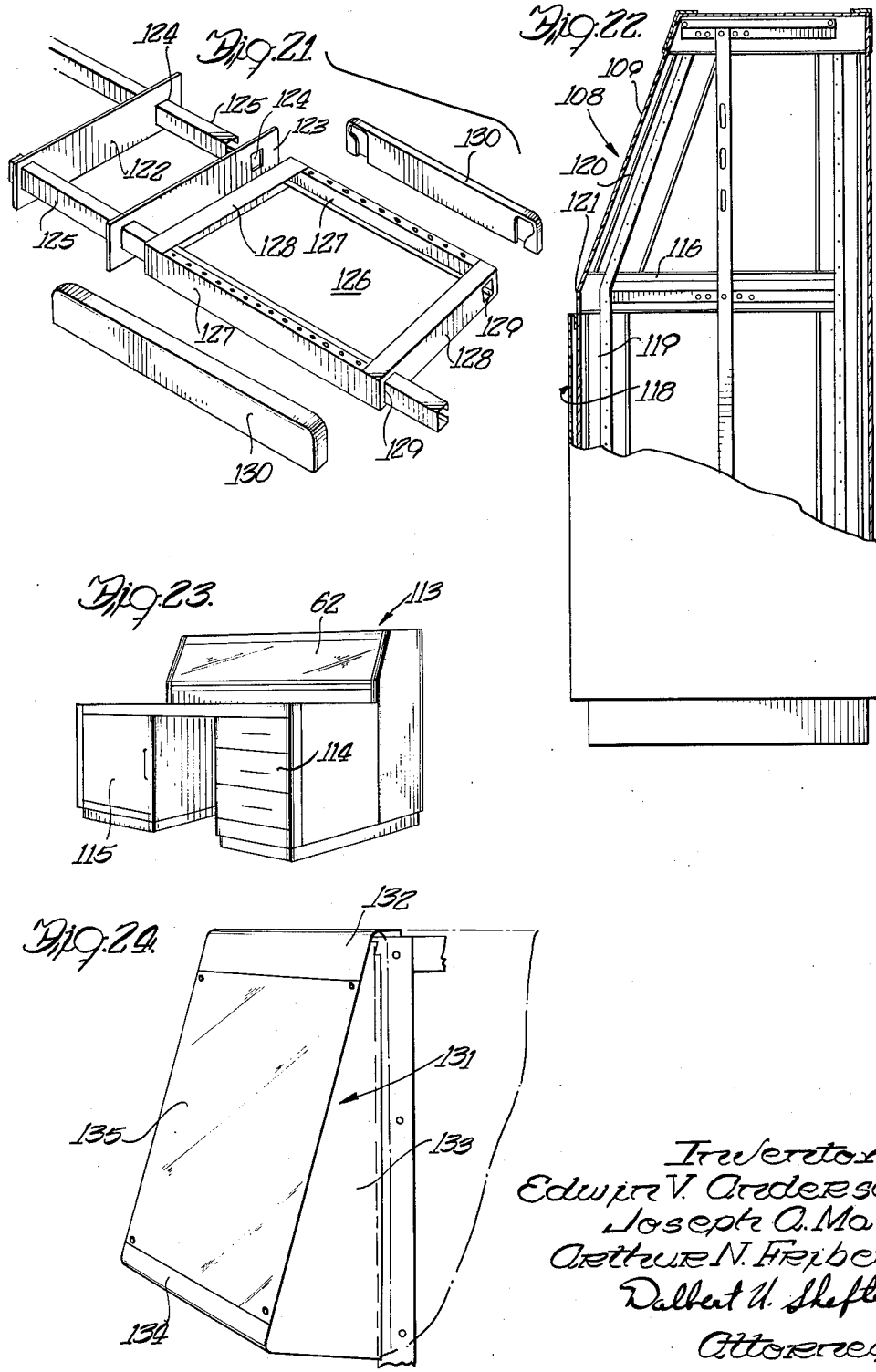

United States Patent Office 3,034,844
Patented May 15, 1962

3,034,844
ENCLOSURE
Edwin V. Anderson and Joseph A. Mack, Glenview, and Arthur N. Friberg, Morton Grove, Ill., assignors to Amco Engineering Co.
Filed Jan. 21, 1958, Ser. No. 710,267
7 Claims. (Cl. 312—257)

This invention relates to an enclosure and more particularly to an enclosure for instruments or electrical equipment.

Enclosures are often required for the mounting of instruments and electrical equipment to provide rigid mounting and to prevent damage. As the instruments and equipment are often of considerable weight, the enclosure unit must be sturdy so as to rigidly house the instruments or equipment. However, the sturdiness must be provided without requiring cross braces or other elements extending into the interior of the frame so that the frame may be universally adaptable to any combination of instruments or equipment without the disadvantage of frame elements extending into the usable space. It is also desirable that the units be combinable to form multi-unit structures with the units interchangeable so that the units may be combined as desired and may be later disassembled and rearranged. When combined, it is desirable that the frames be hidden by the panels and cowlings so that multiple size panels and cowlings may extend across the multi-unit structure to give the appearance of a single unit and to minimize the non-usable frame area.

The present invention provides an enclosure having the above advantages. A sturdy frame is provided by utilizing vertical corner channels shaped to provide sufficient strength for the support of instruments or equipment within the frame without requiring cross pieces extending into the interior of the frame. Panels and cowlings are attached to the exterior of the frame so that no unsightly frame portions are exposed. Further, the frames are combinable to form multi-unit structures with multiple size panels mountable thereon to give a single unit appearance. Also the hidden frames and multiple size panels reduce the unusable space at the juncture of the frames to a minimum so that a compact enclosure unit is provided.

Internal mounting members are provided for use with the enclosure of the present invention and extend along the sides of the frames between corner channels. These internal mounting members add support to shelves, instruments, or equipment mounted in the frame.

The enclosure of the present invention may be formed so as to accommodate brackets and tie rods for lift eyes at the top of the frame so that overhead lifting means can engage the lift eyes for the raising and transporting of an enclosure without having to remove the instruments or equipment mounted therein.

The top panel of the present invention may be perforated or louvered to permit air circulation to cool the elements when the instruments or equipment used produce heat. Also, a filter may be mounted below the top panel to prevent the entry of dirt and dust into the interior of the frame and to maintain a static pressure within the enclosure, especially when a blower unit is operated to force circulation.

It is the general object of the present invention to provide a new and improved enclosure.

Another object of the present invention is to provide a new and improved enclosure consisting of a hidden frame covered by exterior panels and cowlings.

A further object of the present invention is to provide a new and improved enclosure as described in the preceding paragraph wherein a plurality of frames are combinable and covered by multiple size panels and cowlings to produce a single unit appearance.

Still another object of the present invention is to provide a new and improved enclosure having a frame with vertical corner channels shaped to provide strength to support instruments or equipment without the use of bracing members extending into the interior of the frame.

A still further object of the present invention is to provide a new and improved enclosure as described in the preceding paragraph wherein the vertical corner channels extend the full height of the frame.

Yet another object of the present invention is to provide a new and improved enclosure having a frame formed with vertical corner members, each corner member being formed by securing two channel-shaped members together for added strength and rigidity.

A yet further object of the present invention is to provide a new and improved enclosure of the type described above wherein internal mounting elements are mounted in the sides of the frame for the additional support of instruments and equipment.

Still another object of the present invention is to provide a new and improved enclosure having brackets provided for engagement by lifting means for the raising and transporting of the enclosure.

A still further object of the present invention is to provide an enclosure having a perforated or louvered top to permit circulation and ventilation within the enclosure.

Yet another object of the present invention is to provide a new and improved enclosure as described in the preceding paragraph wherein a filter is provided below the perforated or louvered top to prevent the entry of foreign matter into the enclosure.

Other and further objects and advantages of the present invention will be apparent from the following description and drawings in which:

FIG. 1 is a perspective view of an enclosure embodying the present invention;

FIG. 2 is an exploded perspective view of an enclosure similar to that shown in FIG. 1;

FIG. 3 is a horizontal sectional view of the frame of the enclosure of FIG. 1;

FIG. 4 is a vertical sectional view taken along line 4—4 of FIG. 3;

FIG. 5 is a perspective sectional view of one vertical corner channel of the frame of FIG. 1;

FIG. 6 is a perspective view of a vertical corner channel of the corner of FIG. 1 showing other frame members in dot-dash lines;

FIG. 7 is a vertical sectional view similar to FIG. 4 and including internal mounting elements;

FIG. 8 is a vertical sectional view taken along line 8—8 of FIG. 7;

FIG. 9 is a vertical sectional view taken along line 9—9 of FIG. 7;

FIG. 10 is a vertical sectional view similar to FIG. 7 and illustrating an alternate embodiment of the internal mounting structure;

FIG. 11 is a vertical sectional view taken along line 11—11 of FIG. 10;

FIG. 12 is a horizontal sectional view similar to FIG. 3 and illustrating a chassis or equipment mounting means;

FIG. 13 is a perspective sectional view of one corner of the frame and mounting means of FIG. 12;

FIG. 14 is a partial side view of the frame of FIG. 1 and including a bracket and tie rods provided for the raising and transporting of the enclosure unit;

FIG. 15 is a vertical sectional view taken along line 15—15 of FIG. 14;

FIG. 16 is a top plan view of an enclosure with the brackets and tie rods in place;

FIG. 17 is an enlarged plan view of one corner of the frame of FIG. 16;

FIG. 18 is a top plan view of a multi-unit enclosure with a louvered top panel thereon partially broken away to illustrate the filter;

FIG. 19 is a vertical sectional view taken along line 19—19 of FIG. 18;

FIG. 20 is a perspective view, of an enclosure similar to the enclosure of FIG. 1 and having an inclined front portion and a desk portion;

FIG. 21 is an exploded view of the frame, mounting arms, and side cowlings of the desk portion of FIG. 20;

FIG. 22 is a side view partially broken away, of a unit having an inclined forward portion and internal mounting means;

FIG. 23 is a perspective view of a console formed by combining a number of units into a multi-unit structure; and FIG. 24 is a perspective view of a turret construction adaptable for use on the enclosure of FIG. 1.

Referring now to the drawings, an enclosure is shown and indicated generally by the numeral 10. This enclosure consists of a frame 11 to which panels and cowlings are attached to enclose the frame for use as an instrument enclosure or for the mounting of other types of equipment.

The frame 11 is shaped as a hexahedron having a front face, 12, rear face 13, top face 14, bottom 15 and opposing side faces 16. The bottom 15 is in the shape of a rectangular base 18 from the corners of which vertical corner members 19 extend upwardly to a top portion 20 which surrounds the tops of the corner members 19 to form the frame 11.

The base 18 is the support for the frame and the other elements of the enclosure and consists of a front member 21, a rear member 22, and side members 23 joined at their ends to form a rectangle. These members are channel-shaped to provide the necessary strength and rigidity for the support of the enclosure. To further brace the members caster mounting brackets 24 extend diagonally between adjacent members of the base. These brackets 24 also servo to mount casters 25, and for this purpose the brackets are provided with bolt holes 26. If desired, the brackets can be directly attached to the flooring by bolts or other means engaging in the holes 26.

It is desired that the enclosure be capable of supporting relatively heavy equipment therein but without requiring excessive material and the use of cross pieces and bracing members which would increase the unusable space within the enclosure. By the present invention a unique corner member construction is provided with sufficient strength to uphold relatively heavy equipment without increasing the unusable space within the enclosure. Thus, the vertical corner members 19 are of a double channel construction having an outer channel 28 and an inner channel 29. The outer channel 28 has a relatively wide base 30 extending upwardly from the base 18 and in the plane of the side 23 of the base of the frame. The base 30 of the outer channel 28 extends beyond the adjacent front member 21 or rear member 22 and has an outer leg 31 extending in the direction of the other side of the frame parallel to and spaced outwardly from the front 21 or rear 22 of the frame base 18. This outer leg 31 is provided with a plurality of panel mounting holes for the mounting of equipment or panels thereon. The outer channel 28 has an inner leg 34 extending within the frame and parallel to the outer leg 31. This channel construction provides much greater strength and rigidity than would be possible from a flat member.

The inner channel 29 of each vertical corner member 19 has a narrow base 35 secured to the inside of the outer channel base 30 to thus provide a double thickness so as to increase the strength of the corner members 19. The inner channel 29 has legs 36 extending inwardly parallel to the legs 31 and 34 of the outer channel 28 and of approximately the same length. An equipment mounting flange 38 extends from the end of one of the legs 36 parallel to the sides 16 of the frame. The flange is provided with a plurality of holes for the mounting of support members, shelves, or equipment within the frame at any desirable vertical position; and since the flange 38 is aligned with the ends of the legs 31, 34, and 36 of both the inner channel 29 and the outer channel 28 elements may be mounted so as to be braced against the ends of these legs.

The outer channel 28 extends from the top of the frame base 18 to the top of the top portion 20. It extends upwardly along the outside of the top side channel, which abuts the outer leg 31 of the outer channel. The inner leg 34 of the outer channel 28 is recessed as at 41 to accommodate the top side channel 40.

The inner channel 29 extends into the frame base 18 and is secured to the side member 23 of the base. Thus the corner member 19 extends from the very bottom of the frame 11 to the top to give rigid and strong support throughout the entire height of the frame.

In addition to the side channels 40, the top portion 20 of the frame 11 includes front and rear angles 42 which extend across the front and rear of the top portion between corner members 19. Each angle has a vertical portion 44 secured to the outer legs 31 of the outer channel 29 and a horizontal portion 45 extending across the top of the frame and secured to the ends of the top side channels 40. Thus the top portion 20 is secured to the corner members 19 and thereby braces and properly positions the corner members to form a rigid and strong frame.

To further rigidify and strengthen the frame 11, especially when it is a relatively tall frame, intermediate side channels 46 may be secured between corner members on each side of the frame. When these intermediate side channels 46 are utilized, recesses are formed in the inner legs 34 of the outer channels 28 to accommodate the intermediate side channels 46, the ends of which abut the legs 36 of the inner channels 29 and are positioned between the equipment mounting flanges 38 and the bases 30 of the outer channels 28.

Bottom side channels 48 are mounted directly above the frame base 18 and are identical in construction and positioning to the intermediate side channels 46. These channels also serve to strengthen and rigidify the frame.

From the above it is apparent that the present invention provides a very strong rigid frame which can support a relatively heavy piece of equipment without interfering in the usable space within the frame.

To enclose this frame 11 so as to protect the equipment, conceal unsightly elements and give an overall pleasing appearance to the enclosure, panels and cowlings are mounted on the frame as illustrated in FIG. 1 and in exploded FIG. 2. Front and rear panels 49 and 50 are mounted on the outer legs 31 and extend across the front face 12 and rear face 13 of the enclosure 10. The front panel 49 may have instrument dials, controls, and other elements mounted thereon for easy access and reading from the front of the enclosure. These front and rear panels 49 and 50 have inturned flanges 51 which space the face of the panels from the frame 11.

Bottom cowlings are mounted on the frame below the front and rear panels and have flanges 54 which extend to and are secured to the frame base 18 thereby forming a toe space below the cowlings 54 and in front of the frame base 18.

A top panel 55 is mounted to the top portion of the frame 11 and has similar inturned flanges 56. Upper cowlings 57 are secured to the frame 11 and extend from the top of the front and rear panels 49 and 50 over the top of the frame to the extremities of the top panel 55. Side panels 58 having inturned flanges 59 and rounded edges 60 are secured to the sides of the frame as by the use of hangers 61 secured to the top side channels 40 which engage the flanges 59 and support the side panels 58 which are also bolted or screwed to the frame from the interior so that no exposed and unsightly screws, bolts, or other mountings are visible. These side panels 58 extend so that the rounded edges 60 blend into the front, rear, and top panels 49, 50, and 55 respectively and the bottom and upper cowlings 52 and 57 to give a smooth and pleasing appearance to the enclosure 10 and also concealing the frame except for the frame base 18.

Therefore, the frame of the present invention is not exposed and thus scratches and nicks are concealed so that slight damage during storage or transportation will not detract from the appearance of the finished enclosure.

The frame of the present invention is especially adaptable for combining with similar frames into multi-unit enclosures such as illustrated in FIG. 23. The frames can be readily secured together before the panels are attached. Multi-size front panels 62 are secured to extend across the combination, and because of the inturned flanges, the panel faces are spaced from the frame to permit the mounting of instruments on the panel even at positions corresponding to the juncture of the units. Thus no space is wasted when the units are combined and valuable floor space is preserved at a maximum. Also the use of multi-size panels provides a custom appearance to the use of modular units which gives a more appealing appearance without additional cost and permits interchangeability of units as desired from a combination of a relatively few basic elements.

In mounting equipment such as instrument chassis, supports of some type must be used to extend across the frame between the corner members. One type of support which can be used with the present invention is illustrated in FIGS. 12 and 13. Front and rear cross supports 64 and 65 are secured to the equipment mounting flanges 38 and extend across the front and rear of the frame. These supports 64 and 65 have upstanding ends 66 which abut the equipment mounting flange 38 and have holes 68 which mate with the holes of the flange for securing together as by bolts or screws. Thus the front and rear cross supports 64 and 65 may be positioned vertically as desired. Side angles 69 extend between the front and rear cross supports and are secured thereto for the support of an instrument chassis or other equipment. These side angles 69 may be positioned as desired and are provided with slots 70 which can be placed over any one of a plurality of holes 71 in the cross supports 64 and 65. Thus various types of equipment may be accommodated and may be positioned as desired within the frame. Risers 67 are secured along the side angles 69 for the mounting of slidable equipment above the bolts or screws attached to the angles.

If the size, shape or weight of the instruments or equipment to be mounted in the frame cannot be accommodated by the above described supports and angles, additional internal mounting means may be utilized. The present invention includes such internal mounting means as illustrated in FIGS. 7 through 11. The internal mounting means 72 illustrated in the drawings consists of top, intermediate, and bottom cross members 74, 75, and 76 mounted in the top, intermediate, and bottom side channels 40, 46, and 48 respectively and upright members 78 attached to the cross members intermediate the corner members 19 so that equipment or supports may be attached thereto to strengthen the mounting of equipment or instruments within the frame.

The cross members 74, 75, and 76 each have a channel engaging flange 79 secured to the base of the side channel 40, 46, or 48 and from which a leg 80 extends inwardly. This leg is of approximately the same length as the legs of the side channels and has a mounting flange 81 at its inner end extending in the vertical plane of the ends of the legs of the channel. This flange 81 extends in the opposite direction from the channel engaging flange 79 so as not to overlay and thereby obstruct access to the channel engaging flange 79 when mounting the cross member on the side channel. The ends of the flanges 81 of the cross members 74 and 75 are slotted to mate with holes 39 in the channels 29.

The upright members 79 are channel-shaped, and each upright member 79 has its base 82 secured to the mounting flanges 81 of the cross members 74, 75, and 76 as by bolts or screws passing through holes 84 in the base 82 aligned with any one of the plurality of holes 85 in the mounting flanges 81. Since the mounting flanges 81 are in the plane of the ends of the legs of the channels 40, 46, and 48 the base 82 of each upright member 79 is rigidly buttressed by the legs of the side channels. Each upright member 79 has inwardly extending legs which are slotted or have holes for the attaching of supports to strengthen and rigidify the equipment mounted thereon. Also this internal mounting means can be used to support equipment that does not extend the full depth of the enclosure and where it is undesirable to utilize the supports of FIGS. 12 and 13.

As described above, the legs 86 of the upright member 78 extend inwardly as shown in FIGS. 7 through 9. However, this might be undesirable when the full width of the frame is required for the mounting of equipment, in which case an alternate upright member 88 may be used which has legs 89 extending outwardly. These legs are recessed adjacent the top, intermediate and bottom side channels 40, 46, and 48 to accommodate the side channels thus permitting the base 90 of the alternate upright member 88 to be mounted on the mounting flanges 81 of the cross members 74, 75, and 76. In the latter construction, the entire interior area of the frame remains available to house equipment and yet additional mounting structure has been provided.

When the enclosure 10 has equipment mounted therein, it is sometimes desirable to move the entire structure to a new location which can readily be done when the enclosure is mounted on casters 25 as described above. However, even when not mounted on casters, the present invention includes structure which may be added to make the enclosure portable. This is accomplished by providing lift brackets 91 at the corners of the top portion 20 of the frame 11. These lift brackets are of a sturdy construction so as to be capable of supporting the entire weight of the loaded enclosure. They are L-shaped with a vertical leg 92 secured to the inner channel base 35 of the corner members 19 as by bolts 94. The vertical leg 92 extends through a slot formed in the top side channel 40 to the top of the side channel 40. The horizontal leg 95 of each lift bracket 91 extends from the top of the vertical leg into the frame parallel with the front and rear faces 12 and 13 of the frame 11 in contact with the underside of the top angles 42. A gusset 96 is formed at the angle of the lift brackets 91 as by welding, and the lift bracket is channel-shaped in cross section for maximum strength. A threaded hole 98 is formed in the horizontal leg 95 for the receipt of a lift eye 99 which may be screwed into the hole 98 from above the enclosure 10. Each lift eye 99 is further secured to the horizontal leg 95 by a nut 100 welded to the underside of the horizontal leg 95 in line with the threaded hole 98. The lift eyes 99 at the corners of the enclosure are engageable by lifting hooks (not shown) for the lifting of the enclosure by a pulley or other means. To further strengthen the enclosure when being lifted or transported, diagonal cross braces 101 may be attached to diagonally opposite lift brackets 91 by means of screws 102 passing through the cross braces 101 into the lift brackets 91 and are also secured in place by the lift eyes 99 which pass through holes 103 in the cross braces 101 as they are screwed into the lift brackets 91.

With the above lift bracket construction an enclosure 10 may be loaded with exceptionally heavy equipment and yet be portable without damaging either the enclosure or the equipment contained therein.

The equipment contained in the enclosure in the present invention may be of a type which develops heat during use such as any of many electrical components. When this is the case, it is desirable that air circulates through the enclosure to reduce the temperature for safe operation. In the embodiment illustrated in FIGS. 18 and 19 the top panel 55 is formed with louvers 104 therein so that when the hot air rises, it will pass through the louvers permitting cooler air to enter at the bottom. It may even be desirable to employ a blower unit to cool the equipment in the enclosure in which case the louvers 104 are of even more importance. A blower unit is described in the co-pending applications Serial No. 683,406, filed September 11, 1957, for a Blower System, now Patent No. 2,934,164, issued April 26, 1960, and Serial No. D. 48,245, filed October 28, 1957, for a Blower Housing, now abandoned.

When the top panel 55 has louvers or other ventilation openings, there is the danger of foreign matter such as dirt entering the enclosure and damaging or obstructing the operation of the equipment. To prevent this, the present invention provides an air filter 106 secured under the top panel 55. This filter can be of any common filter material as long as the air is permitted to pass therethrough under the force of a blower or simply by convection. This filter 106 serves an additional purpose when a blower is being used as it aids in maintaining a static pressure within the enclosure so that the instruments or equipment will not be effected by the pressure change caused by gusts of air.

The enclosure described above is adaptable to many sizes and shapes; thus FIG. 22 shows an enclosure 108 with an inclined top portion 109, FIG. 20 shows an enclosure 110 similar to the enclosure of FIG. 22 and in addition having a writing top 112 extending therefrom, and FIG. 23 shows a combination of several units into a console 113 with drawers 114 and a door 115 attached to the front in place of front panels.

The enclosure 108 of FIG. 22 is identical to the structure of FIGS. 1 through 6 except that the intermediate side channel 116 extends to the front face of the enclosure and the front vertical corner member 118 has a lower portion 119 and an inclined portion 120, both secured to the intermediate side channel 116. Also an intermediate front plate 121 extends between the front corner members 118 adjacent the intermediate side channels 116.

The writing top 112 illustrated in FIGS. 20 and 21 may be mounted in front and rear cross pieces 122 and 123 secured to the frame of the enclosure 110. Each cross piece is provided with a rectangular opening 124 adjacent each side of the enclosure for the receipt of a pair of parallel and rectangular support arms 125. Since the support arms 125 extend through the openings 124 in both the front and rear cross pieces 122 and 123, they are rigidly held in a cantilever manner and project outwardly for the support of the writing top frame 126. The support arms 125 may be directly secured to the channels 19 by bolts through the holes 39, in which case the cross members 122 and 123 are not necessary. The writing top frame 126 consists of side channels 127 and end channels 128. The end channels have rectangular openings 129 arranged to receive support arms 125 which are secured as by bolts or screws to the side channels 127 to securely position the writing top frame 126. Side and end cowlings 130 are secured to the periphery of the writing top frame, and any desirable top material may be mounted on the frame. Thus, a sturdy projection is provided which can be used as a writing top or for some other platform use.

It is often desirable to mount turrets to give an inclined surface on the enclosure. One type of turret 131 is illustrated in FIG. 24 wherein the top 132 of the turret replaces the top cowling of an enclosure, and the turret is mounted in the space normally occupied by a front panel. The turret has side plates 133, a bottom cowling 134 and a face panel 135. These elements are similar to the panels and cowlings of the enclosure described above and give a pleasing appearance when combined therewith.

From the above it is apparent that the present invention provides an exceptionally strong enclosure which utilizes the minimum of material and the framework does not obstruct the useable space within the enclosure. The structure is adaptable for modular combination to provide multi-unit enclosures. The panels and cowlings completely cover the frame so that the appearance of the enclosure is not affected by unsightly portions of the frame. The unique mounting structures combined in this invention provide easy mounting for many different types of instruments and equipment and are readily adjustable to the particular size and weight required. Further the present invention includes brackets and braces which make it adaptable for use with lift means for lifting and transporting the enclosures in a portable manner.

While this invention is susceptible of embodiments in many different forms, there is shown in the drawings and is herein described in detail one embodiment with the understanding that the present disclosure is to be considered as an exemplification of the principles of the invention, and is not intended to limit the invention to the embodiment illustrated. The scope of the invention will be pointed out in the appended claims.

We claim as our invention:

1. An enclosure, comprising: a hexahedral frame having a top face, a bottom face, a front face, a rear face and opposing side faces, said frame having a rectangular base, vertical corner members extending upwardly from the corners of the base, and horizontal top pieces secured to and extending between the tops of said vertical corner members, each corner member having an outer channel with the base of the channel parallel to the plane of the side of the frame, and an inner channel having its base secured to the base of the outer channel, each inner channel having an equipment mounting flange parallel to the base of the outer channel and spaced interiorly therefrom by a leg of the inner channel, the equipment mounting flanges being provided for the mounting of equipment in the frame at desired vertical levels, each front corner member having a leg of the outer channel extending from the base parallel to and adjacent the front of the frame to form a panel mounting flange, and each outer channel of the rear vertical members having a leg extending parallel to and adjacent the rear of the frame to form a panel mounting flange; and front and rear panels mounted on the panel mounting flanges and extending across the front and rear of the frame.

2. An enclosure, comprising: a hexahedral frame having a top face, a bottom face, a front face, a rear face, and opposing side faces, said frame having a rectangular base, vertical corner members extending upwardly from the corners of the base, and horizontal top pieces secured to and extending between the tops of said vertical corner members, each corner member having an outer channel with the base of the channel parallel to the plane of the side of the frame and extending from the base to the top of the top cross pieces, and an inner channel having its base secured to the base of the outer channel and extending from the bottom of the base to the bottom of the top cross piece, each inner channel having an equipment mounting flange parallel to the base of the outer channel and spaced interiorly therefrom by a leg of the inner channel, the equipment mounting flanges being provided for the mounting of equipment in the frame at desired vertical levels, each front corner member having a leg of the outer channel extending from the base parallel to and adjacent the front of the frame to form a panel mounting flange, and each outer channel of the rear vertical members having a leg extending parallel to and adjacent the rear of the frame to form a panel mounting flange; and front and rear panels mounted on the panel mounting flanges and extending across the front and rear of the frame.

3. An enclosure, comprising: a hexahedral frame having a top face, a bottom face, a front face, a rear face and opposing side faces, said frame having a rectangular base, vertical corner members extending upwardly from the corners of the base, each corner member having an outer channel with the base of the channel parallel to the plane of the side of the frame, and horizontally extending top channels on each side of the frame with the base of each top channel secured to the bases of the outer channels of the front and rear corner members, each corner member having an inner channel with its base secured to the base of the outer channel, the top channels having lower legs extending horizontally toward the opposite side faces of the frame, the top of the inner channels of the corner members abutting the undersides of said lower legs.

4. An enclosure, comprising: a hexahedral frame having a top face, a bottom face, a front face, a rear face and opposing side faces, said frame having a rectangular base, vertical corner members extending upwardly from the corners of the base, each corner member having an outer channel with the base of the channel parallel to the plane of the side of the frame, and horizontally extending top channels on each side of the frame with the base of each top channel secured to the bases of the outer channels of the front and rear corner members, each corner member having an inner channel with its base secured to the base of the outer channel, the top channels having lower legs extending horizontally toward the opposite side faces of the frame, the top of the inner channels of the corner members abutting the undersides of said lower legs, and horizontally extending intermediate channels on each side of the frame with the base of each top channel secured to the bases of the outer channels of the front and rear corner members, the legs of the outer channels having recesses to accommodate the intermediate channel.

5. An enclosure, comprising: a hexahedral frame having a top face, a bottom face, a front face, a rear face and opposing side faces, said frame having a rectangular base, vertical corner members extending upwardly from the corners of the base, each corner member having an outer channel and an inner channel, the base of the outer channel being in the plane of the side face of the frame and extending beyond the front of the base, the base of the inner channel being secured to the base of the outer channel and extending into the rectangular base; and panels secured to the outer channels and extending across the front and rear faces of the frame above the rectangular base, the extensions of the outer channels beyond the base forming toe spaces below the panels.

6. An enclosure comprising, in combination, a frame having a top face, a bottom face, a front face, a rear face, and opposing side faces, said frame having a rectangular base; vertical corner members extending upwardly from the corners of the base, each corner member having an outer channel with the base of the channel parallel to the plane of the side frame, and an inner channel having its base secured to the base of the outer channel, each inner channel having an equipment mounting flange parallel to the base of the outer channel and spaced interiorly therefrom by a leg of the inner channel, a leg of the outer channel extending from the base thereof parallel to and adjacent the front of the frame to form a panel mounting flange; enclosure panels secured to the panel mounting flanges of the vertical members, and equipment mounting members secured to the equipment mounting flanges.

7. An enclosure comprising, in combination, a frame having a top face, a bottom face, a front face, a rear face, and opposing side faces, said frame having a rectangulr base; vertical corner members extending upwardly from the corners of the base, each corner member having an outer channel with the base of the channel parallel to the plane of the side frame, and an inner channel having its base secured to the base of the outer channel, each inner channel having an equipment mounting flange parallel to the base of the outer channel and spaced interiorly therefrom by a leg of the inner channel, means defining a series of equipment mounting stations along said equipment mounting flange, a leg of the outer channel extending from the base thereof parallel to and adjacent the front of the frame to form a panel mounting flange; enclosure panels secured to the panel mounting flanges of the vertical members, and equipment mounting members removably and adjustably secured to the equipment mounting flanges at pre-selected ones of the equipment mounting stations.

References Cited in the file of this patent

UNITED STATES PATENTS

| | | |
|---|---|---|
| 725,851 | Kopp | Apr. 21, 1903 |
| 1,374,868 | White | Apr. 12, 1921 |
| 1,729,475 | Brainard | Sept. 24, 1929 |
| 1,841,330 | Gronberg | Jan. 12, 1932 |
| 1,991,397 | Lampman | Feb. 19, 1935 |
| 2,047,794 | Meyer | July 14, 1936 |
| 2,058,263 | Rosendale | Oct. 20, 1936 |
| 2,162,523 | Blood | June 13, 1939 |
| 2,398,153 | Nielsen | Apr. 9, 1946 |
| 2,424,217 | Bales | July 22, 1947 |
| 2,463,674 | Bell et al. | Mar. 8, 1949 |
| 2,581,971 | Perrault | Jan. 8, 1952 |
| 2,620,252 | Restivo | Dec. 2, 1952 |
| 2,691,562 | West | Oct. 12, 1954 |
| 2,831,745 | Parmet | Apr. 22, 1958 |
| 2,855,260 | Reiss | Oct. 7, 1958 |
| 2,855,261 | Wells | Oct. 7, 1958 |
| 2,912,294 | Wells | Nov. 10, 1959 |

OTHER REFERENCES

Emcor Bulletin 102–CA10M–154, copyrighted 1954, published by Elgin Metalformers Corporation, 903 Liberty St., Elgin, Ill.